United States Patent
Kinbara

[11] Patent Number: 5,864,213
[45] Date of Patent: Jan. 26, 1999

[54] ELECTRIC DISCHARGE MACHINE

[75] Inventor: Yoshihide Kinbara, Tokyo, Japan

[73] Assignee: Mitsubishi Denki Kabushiki Kaisha, Tokyo, Japan

[21] Appl. No.: 961,946

[22] Filed: Oct. 31, 1997

[30] Foreign Application Priority Data

May 14, 1997 [JP] Japan ..................................... 9-123895

[51] Int. Cl.$^6$ ...................................................... G05F 1/00
[52] U.S. Cl. .......................... 315/307; 315/360; 315/225; 219/69.11; 219/69.2
[58] Field of Search ..................................... 315/307, 360, 315/225, 174; 219/69.1, 69.2, 69.11, 69.13

[56] References Cited

U.S. PATENT DOCUMENTS

| Re. 29,589 | 3/1978 | Inoue .................................... 315/225 X |
| 3,854,026 | 12/1974 | Bell, Jr. et al. ...................... 315/225 X |
| 3,864,541 | 2/1975 | Inoue .................................... 219/69 C |
| 4,447,713 | 5/1984 | Tsurumoto et al. .................. 219/69 G |

FOREIGN PATENT DOCUMENTS 57-138530  8/1982  Japan .

Primary Examiner—Don Wong
Assistant Examiner—Haissa Philogene
Attorney, Agent, or Firm—Sughrue, Mion, Zinn, Macpeak & Seas, PLLC

[57] ABSTRACT

An electric discharge machine is equipped with a current detector 410 for causing an auxiliary discharge circuit 200 to be operated and for detecting that a value of an auxiliary current exceeds a predetermined value; a timer 401 having first setting time longer than time defined until flowing of charge current into the auxiliary current is ended; a timer 403 having second setting time defined after a detection is made that the value of the auxiliary current exceeds the predetermined value until the discharge operation is brought into a stable condition after the first setting time; an operation means 470 for stopping the auxiliary discharge circuit 200 after the second setting time has passed, and for causing the main discharge circuit 300 to be operated during preselected time; and a timer 440 having a setting time longer than such time that after the operation means causes the main discharge circuit to be operated during the preselected time, the current value of the main discharge circuit 300 becomes lower than, or equal to a predetermined value; and for producing an end signal after this setting time has passed.

8 Claims, 6 Drawing Sheets

FIG.6A PRIOR ART
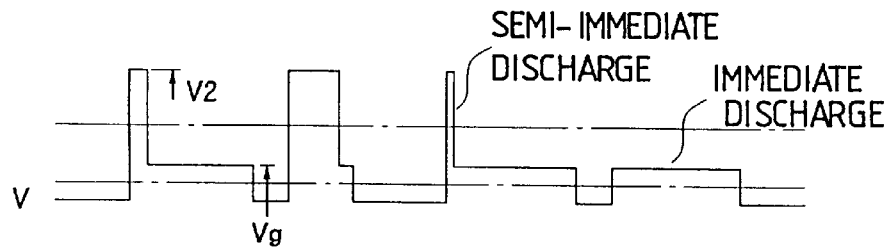
FIG.6B PRIOR ART
FIG.6C PRIOR ART
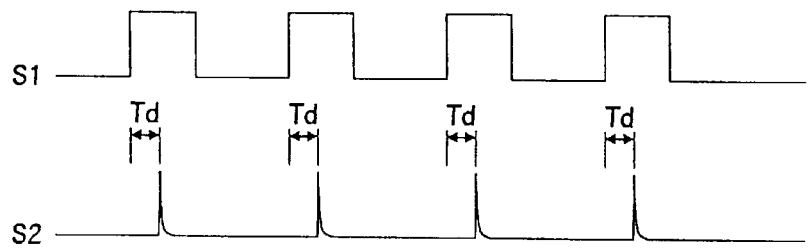
FIG.6D PRIOR ART
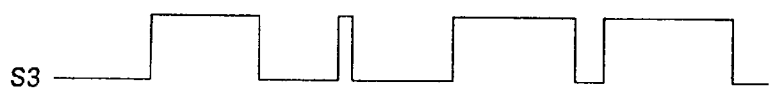
FIG.6E PRIOR ART
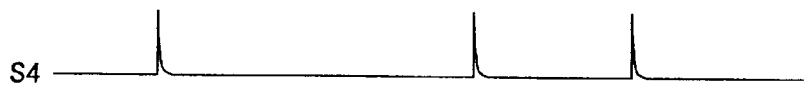
FIG.6F PRIOR ART
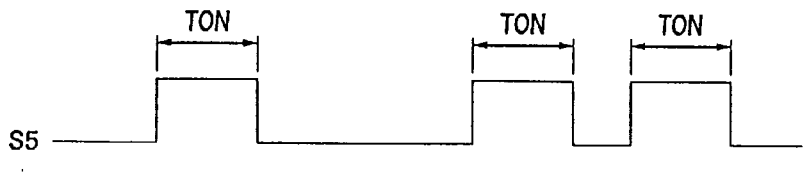
FIG.6G PRIOR ART

ELECTRIC DISCHARGE MACHINE

BACKGROUND OF THE INVENTION

1. Field of the Invention

The present invention is related to a control of discharge energy of an electric discharge machine for supplying processing energy between an electrode and a workpiece provided in a processing fluid.

2. Description of the Related Art

As a conventional electric discharge machine, FIG. 5 represents the electric discharge machine disclosed in Japanese Laid-open Patent Application No. 57-138530. In FIG. 5, the electric discharge machine is equipped with an electrode, a DC power supply 24 having a variable voltage applied to a workpiece 2, and another DC power supply 26 having a constant voltage value V1. The output of the DC power supply 24 is switching-controlled by a sub-switching element 28, and the output of the DC power supply 26 is switching-controlled by a main switching element 30. It should be noted that reverse-current blocking diodes 46 and 48 are series-inserted into the respective power supplies 24 and 26.

This electric discharge machine is constituted by a delay-differential circuit 34 connected to an output of an oscillator 32 for periodically producing a pulse signal; a one-shot multivibrator 38 operated in response to a rising edge of an AND-gate output from an AND circuit 36; an amplifier 42 for amplifying a current flowing when the electric discharge occurs by either the sub-switching element 28 or the main switching element 30 by detecting a voltage produced across a shunt resistor 40; and a judging apparatus 44 for producing a high-output when the output of this amplifier 42 is located within a predetermined range, and a low-output when the output of this amplifier 42 is located outside this range.

Referring now to FIG. 5 and FIGS. 6A to 6G, operation of the electric discharge machine with the above-described arrangement will be described. First, when the power supply is turned ON, a rectangular pulse signal S1 (see FIG. 6B) is generated from the oscillator 32, and then the sub-transistor 28 is turned ON to thereby apply a voltage V2 (see FIG. 6A) to the electrode 3 and the workpiece 2. The pulse signal S1 of the oscillator 32 is processed by the delay/differential circuit 34 to produce an output signal S2 (see FIG. 6C) by a time delay Td.

On the other hand, the electric discharge occurs between the electrode 3 and the workpiece 2, so that the current flows, and the voltage across both terminals of the shunt resistor 40 is amplified. When the amplified voltage reaches a predetermined voltage value, the judging apparatus 44 outputs a high-signal S3 (see FIG. 6D). This signal S3 and the output signal S2 of the delay/differential circuit 34 are AND-gated by the AND circuit 36 to thereby produce a signal S4 (see FIG. 6E). A vibrator 38 is triggered in response to this output signal S4, and the main switching element 30 is driven in response to an output signal S5 of the vibrator 38, so that the electric discharge between the electrode 3 and the workpiece 2 is continued.

However, the conventional electric discharge machine is arranged by the above-described manner. Even when the electric discharge conditions are deteriorated, the occurrence of the electric discharge is judged by the judging apparatus 44 in such a manner that the voltage produced by amplifying the voltage across the both terminals of the resistor 40 is located in the preselected value range. Under the deteriorated condition, there are a so-called "immediate electric discharge" in which the voltage between the electrode 3 and the workpiece 2 does not reach V2, but immediately becomes Vg, and a so-called "semi-immediate electric discharge" in which after the voltage between the electrode 3 and the workpiece 2 reaches V2, and this voltage immediately becomes Vg. As a consequence, there is such a problem that even when the immediate electric discharge and the semi-immediate electric discharge happen to occur, the electric discharge machine is operated similar to the normal electric discharge operation.

SUMMARY OF THE INVENTION

The present invention has been made to solve the above-described problem, and therefore, has an object to provide an electric discharge machine capable of discriminating the normal electric discharge from the semi-immediate discharge and also the immediate discharge, and further capable of easily performing the normal electric discharge operation even when either the semi-immediate electric discharge or the immediate electric discharge occurs, resulting in deterioration of electric discharge processing conditions.

In order to acheive the above object, an electric discharge machine, according to a first invention, is featured by such an electric discharge machine equipped with a main discharge circuit and an auxiliary discharge circuit for applying a voltage between an electrode and a workpiece, and for processing the workpiece by repeating a time period within which after the auxiliary discharge circuit has been operated, the main discharge circuit is operated and stopped, comprising: auxiliary discharge current detecting means for causing the auxiliary discharge circuit to be operated in response to a starting signal and for detecting that a value of an auxiliary current flowing through the auxiliary discharge circuit exceeds a predetermined value; first timer means having first setting time longer than time defined from the starting signal until flowing of a charge current into the auxiliary current is ended; second timer means having second setting time defined after a detection is made that the value of the auxiliary current exceeds the predetermined value until the discharge operation is brought into a stable condition after the first setting time of the first timer means; operation means for stopping the auxiliary discharge circuit after the second setting time has passed, and for causing the main discharge circuit to be operated during preselected time; third timer means having third setting time longer than such time that after the operation means causes the main discharge circuit to be operated during the preselected time, the current value of the main discharge circuit becomes lower than, or equal to a predetermined value; and for producing an end signal after the third setting time has passed; and ending means for recognizing an end of the time period in response to the end signal of this third timer means.

An electric discharge machine, according to a second invention, is featured by comprising constant value detecting means for detecting that the current value of the auxiliary discharge circuit becomes substantially constant after the first time by the first timer means has passed.

An electric discharge machine, according to a third invention, is featured by comprising main discharge current detecting means for detecting that after the main discharge circuit is operated by the operation means during the preselected time, the current of the main discharge circuit is attenuated.

An electric discharge machine, according to a fourth invention, is featured by such that the value of the third setting time of the end means can be automatically varied.

An electric discharge machine, according to a fifth invention, is featured by comprising auxiliary discharge preparation time detecting means for detecting time defined after the first setting time by the timer means has passed and until the auxiliary discharge current detecting means detects the auxiliary discharge current; and judging means for judging such a case that the time value of the auxiliary discharge preparation time detecting means is shorter than a preset time value as an extraordinary case.

An electric discharge machine, according to a sixth invention, is featured by that the predetermined time is zero.

An electric discharge machine, according to a seventh invention, is featured by that when the judging means judges it as the extraordinary case, the starting signal is interrupted.

An electric discharge machine, according to an eighth invention, is featured by comprising a plurality of switching elements of the main discharge circuit; a plurality of resistors series-connected to the switching elements, a ratio of respective resistance values of the plural resistors being equal to a reverse number of a binary number; and switching element selecting means for selecting operations of the switching elements.

BRIEF DESCRIPTION OF THE DRAWINGS

Other objects, features, and advantages of the present invention will be apparent when carefully reading the following detailed description in connection with the accompanying drawings, in which:

FIGS. 6A to 6G are timing charts and waveform diagrams of the circuit shown in FIG. 5.

DETAILED DESCRIPTION OF THE PREFERRED EMBODIMENTS

Now, a description will be given in more detail of preferred embodiments of the present invention with reference to the accompanying drawings.

EMBODIMENT 1

Figure 1:
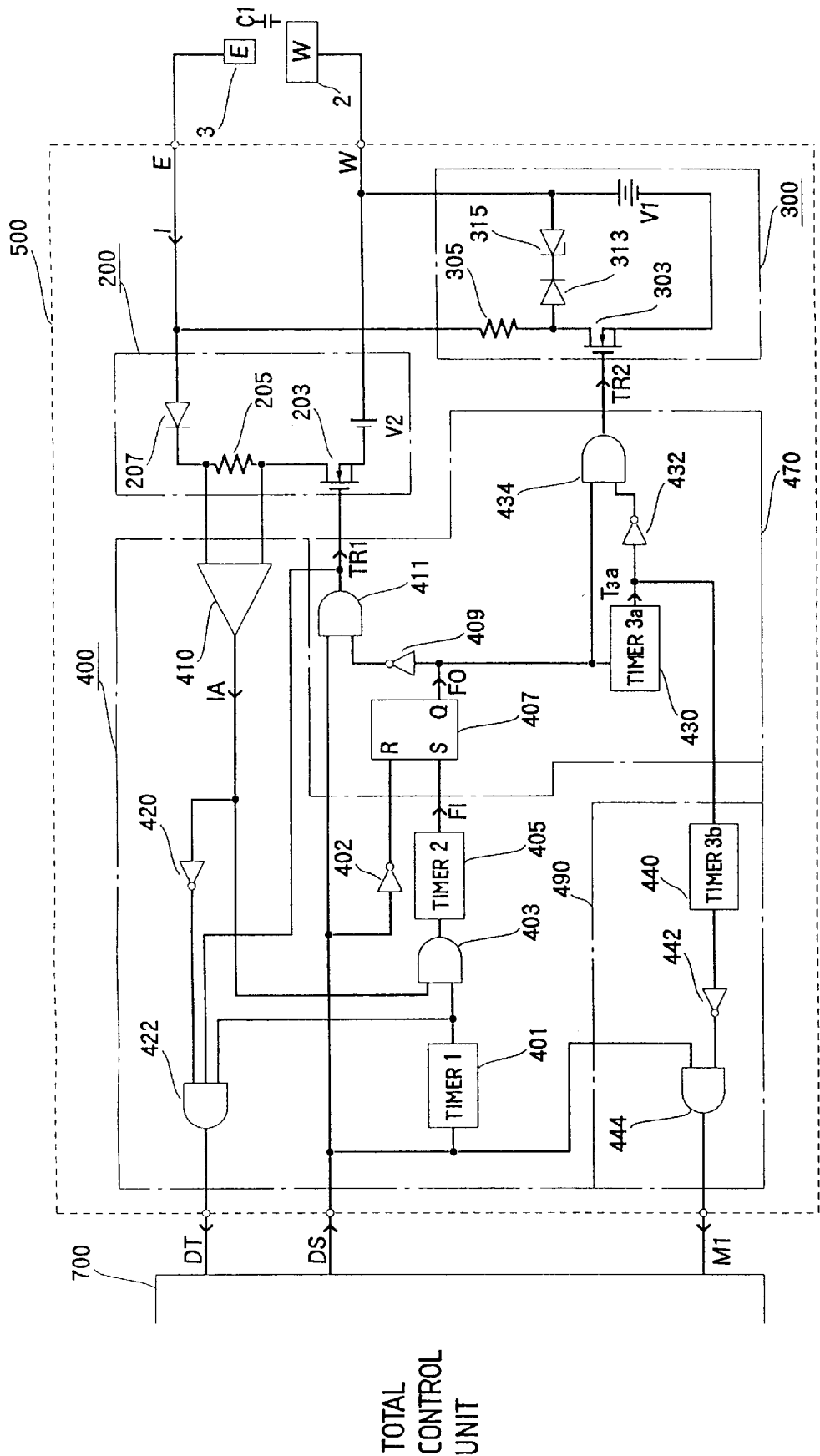
FIG. 1 is a circuit diagram of an electric discharge machine according to an embodiment of this invention.

An embodiment of this invention will now be explained with reference to FIG. 1 and FIGS. 2A to 2K. In FIG. 1, an electric discharge circuit of this electric discharge machine is constructed of a discharge control unit 400 for controlling an auxiliary discharge circuit 200 and a main discharge circuit 300, and a total control unit 700 for supplying/receiving an instruction to/from the discharge control unit 400.

In the auxiliary discharge circuit 200, a DC power supply V2, a switching element 203, a resistor 205, and a diode 207 are connected in series to each other.

In the main discharge circuit 300, a DC power supply V1, a switching element 303, and a resistor 305 are connected in series to each other. A diode 313 and a zener diode 315 are series-connected between a junction point of the switching element 303 and the resistor 305, and an anode of the DC power supply V1. The auxiliary discharge circuit 200 and the main discharge circuit 300 are connected in parallel to output terminals E and W.

The discharge control unit 400 is equipped with a current detector 410 functioning as auxiliary discharge current means for causing the auxiliary discharge circuit 200 in response to a starting signal of the electric discharge, and for detecting a voltage across both terminals of the resistor 305 by checking that a value of an auxiliary current flowing through the auxiliary discharge circuit 200 exceeds a predetermined value. This discharge control unit 400 is further arranged by a first timer having first setting time longer than time defined from the discharge starting signal until flowing of a current into the auxiliary discharge circuit 200 is ended which charges an electric capacity C1 between an electrode 3 and a workpiece 2; a second timer means having second setting time defined after a detection is made that the value of the auxiliary current exceeds the predetermined value until the discharge operation is brought into a stable condition after the first setting time of the first timer 401; an operation means 470 for stopping the auxiliary discharge circuit 200 after the second setting time has passed, and for causing the main discharge circuit 300 to be operated during preselected time; a third timer 440 having third setting time longer than such time that after the operation means 470 causes the main discharge circuit 300 to be operated during the preselected time, the current value of the main discharge circuit becomes lower than, or equal to a predetermined value; and for producing an end signal after the third setting time has passed; and an ending means 490 for recognizing an end of the time period in response to the output (end) signal of this third timer 440. It should be noted that the setting time of the timer 405 may be set to zero when the electric discharge operation is immediately after brought into the stable condition.

An input of the first timer 401 is connected to an electric discharge instruction signal line DS, and an output thereof is connected to one input of the AND circuit 403. The other input of the AND circuit 403 is connected to a current detection line IA corresponding to an output of the current detector 410, and an output of the AND circuit 403 is connected to an input of the second timer 405.

In the operation means 470, an output of the timer 405 is connected to an S-terminal of a flip-flop circuit 407; the discharge instruction signal line DS is connected via a NOT circuit 402 to an R-terminal of the flip-flop circuit 407; a Q-terminal of the outputs of the flip-flop circuit 407 is connected via another NOT circuit 409 to the one input of the AND circuit 411; the discharge instruction signal DS is connected to the other input of the AND circuit 411; the output of the Q-terminal of the flip-flop circuit 407 is directly connected into one input of an AND circuit 434; an output of a NOT circuit 432 is connected via the timer 430 to the other input of the AND circuit 434; and the output of the AND circuit 434 is connected to a gate of the switching element 303.

In the end means 490, an input of the timer 440 is connected to the output of the timer 430; an output of the timer 440 is connected via a NOT circuit 442 to one input of an AND circuit 444, and the other input of the AND circuit 444 is connected to the discharge instruction signal line DS.

Also, the auxiliary discharge preparation time detecting means is arranged as follows: That is, while a discharge starting signal is produced (discharge instruction signal DS is high), the current detector 410 detects that a current flows through the resistor 205 after the setting time of the timer 401, and a voltage across both the terminals of the resistor 205 becomes higher than, or equal to a predetermined voltage, and thus produces a high signal at the output thereof. Only during time defined after the setting time of the timer 401 has passed, and the output of the current detector 410 becomes high, a pulse signal (see FIG. 2K) is produced from the output of the AND circuit 422. Concretely speaking, the output of the current detector 410 is connected via a NOT circuit 420 to the input of the AND circuit 422, the output of the timer 401 is connected to the input of the AND circuit 422, the output of the AND circuit 411 is connected to the input of the AND circuit 422, and the output of the AND circuit 422 is connected to the total control unit 700 by an auxiliary discharge preparation time line DT.

The setting time of the timer 430 is ON time during which the switching element 303 is turned ON. The setting time of the timer 440 is set to become longer than such time that after the switching element 303 is turned ON to interrupt the current flowing through the main discharge circuit 300, this current is attenuated to become smaller than, or equal to a predetermined value.

Operation of the electric discharge machine with the above-described arrangement will now be explained based on FIG. 1, and timing charts and waveform diagrams of FIGS. 2A to 2K. When the electric discharge machine is turned OFF, the discharge instruction signal line DS from the total control unit 700 is low, and a high-signal is inputted to the R terminal of the flip-flop circuit 407 via the NOT circuit 402. As a result, the output Q of the flip-flop circuit 407 becomes low, and the high-signal is entered via the NOT circuit 409 to the AND circuit 411. However, since the other input terminal of the AND circuit 411 is at a low level, the output level of the AND circuit 411 becomes low, and thus the switching element 203 is turned OFF. It should also be noted that the low-signal corresponding to the output of the timer 405 is entered to the S-terminal of the flip-flop 407.

Next, at time T1, the level of the discharge instruction signal line DS is changed from the low level to the high level from the total control unit 700 (see FIG. 2A), the low-signal is inputted to the R-terminal of the flip-flop circuit 407 via the NOT circuit 402, and the output Q thereof is under low level. Therefore, the high-signal is entered to one input of the AND circuit 411 via the NOT circuit 409, and the discharge instruction signal line DS corresponding to the other input is a high-level, so that the output level of the AND circuit 411 becomes high, and the ON signal (see FIG. 2B) is entered to the gate of the switching element 203. Then, the switching element 203 is turned ON, so that the voltage of the DC power supply V2 is applied via the resistor 205 and the diode 207 between the electrode 3 and the workpiece 2 (see FIG. 2J), and then a current ID starts to flow even when the electric discharge does not occur by the electric capacity Cl between the electrode 3 and the workpiece 2 (see FIG. 2I).

Figure 2:
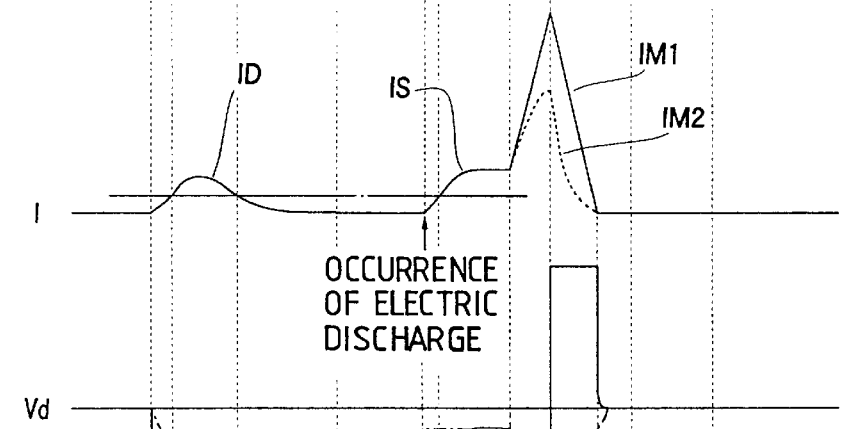
FIGS. 2A to 2K are timing charts and waveform diagrams of the circuit shown FIG. 1.
Figure 3:
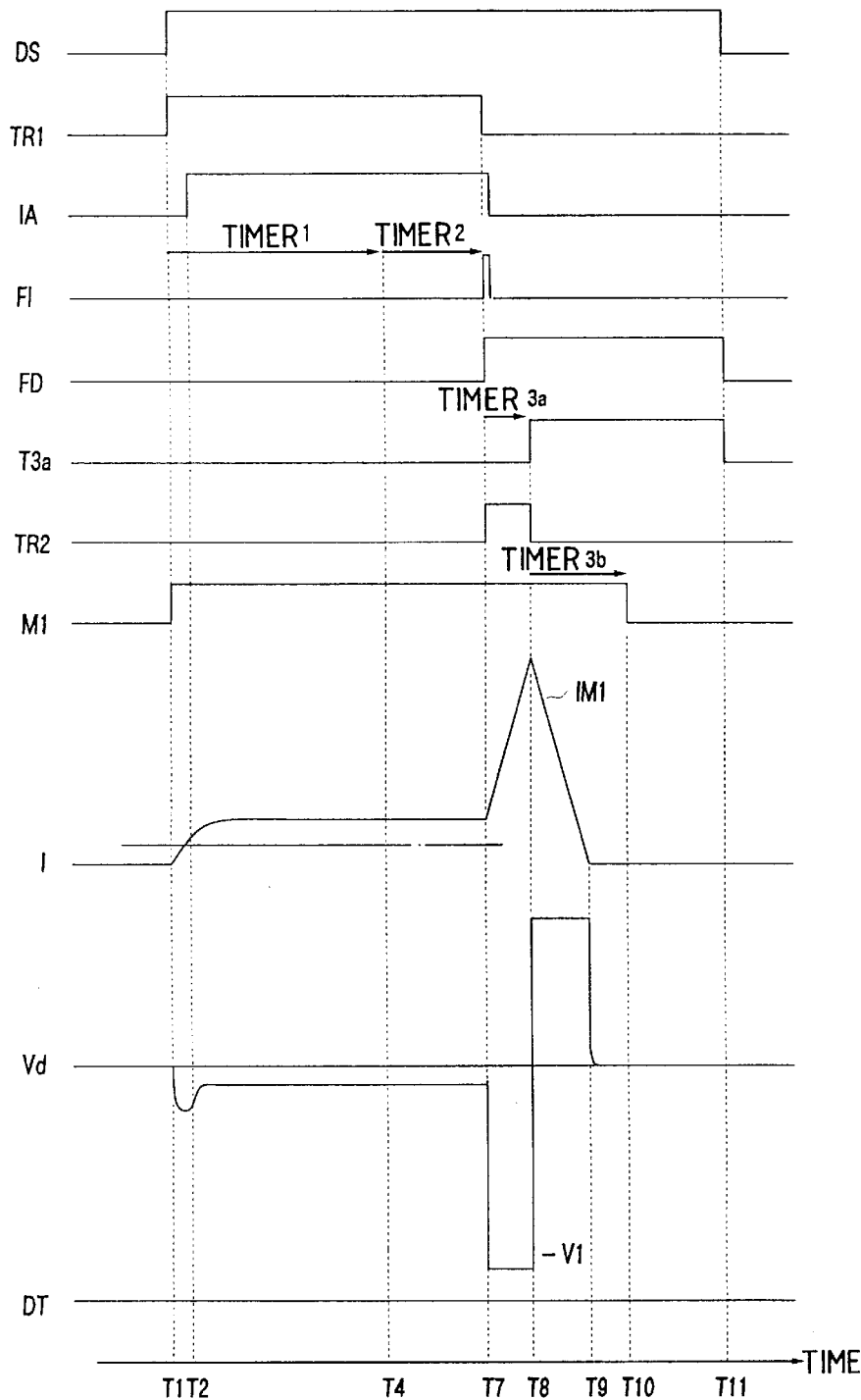
FIGS. 3A to 3K are timing charts and waveform diagrams of the circuit shown in FIG. 1.

At the same time, namely time T1, since the discharge instruction signal line DS becomes a high level and the output level of the NOT circuit 442 becomes high, the level of the signal line M1 equal to the output of the AND circuit 444 is changed from the low level to the high level during the operation (see FIG. 2H).

At time T2, the voltage drop caused by the current flowing through the resistor 205 becomes higher than a predetermined value, and then the current detector 410 continuously outputs a high-signal which becomes a pulse signal PD until time T3 where the level of the current detection signal line IA is changed from the low level to the high level (see FIG. 2C), and the above-described voltage drop becomes lower than a predetermined value.

At time T4, since the level of the discharge instruction signal line DS is changed from the low level to the high level by the time T1, the output of the timer 401 is changed from the low level to the high level delayed only by the first setting time. Since the high-level output signal of the timer 401 and the high-level signal of the current detection signal line IA and AND-gated by the AND circuit 403, it is possible to avoid the erroneous discharge detection caused by the charge current flowing through the electric capacity C1 between the electrode 3 and the workpiece 2 until the output signal of the timer 401 becomes the high level. The high-level output signal of the timer 401, the high-level signal produced from the output signal of the current detection signal IA via the NOT circuit 420, and the high-level signal from the AND circuit 411 are inputted to the AND circuit 422, a pulse signal having time "tn" is produced on the auxiliary discharge preparation time line DT of the output of the AND circuit 422 (see FIG. 2K). This pulse signal is entered into the total control unit 700, and then the total control unit 700 judges that neither the immediate discharge, nor the semi-immediate discharge occurs.

Since the voltage V2 is continuously applied between the electrode 3 and the workpiece 3, electric discharge occurs at time T5, so that a current IS will flow. At time T6, a voltage drop processed by the current flowing through the resistor 205 exceeds a predetermined value, the level of the current detection signal line IA corresponding to the output of the current detector 410 is changed from the low level to the high level (see FIG. 2C). At the same time, the low-level signal is inputted via the NOT circuit 420 to the AND circuit 422, so that the level of the auxiliary discharge preparation time line DT is changed from the high level to the low level (see FIG. 2K).

At the same time, the output of the AND circuit 403 is changed from the low level to the high level. After the setting time of timer 405 has passed, namely at time T7, the output level of the timer 405 is changed from the low level to the high level (see FIG. 2D), and the level of the S-terminal of the flip-flop circuit 407 becomes high. Then, the output terminal Q thereof becomes the high level, and the input signal level of the AND circuit 411 via the NOT circuit 409 becomes low, so that the switching element 203 is turned OFF, and the current flowing through the resistor 205 becomes zero, and the level of the current detection signal line IA immediately becomes low.

On the other hand, the level at the output terminal Q of the flip-flop circuit 407 becomes high, and the output signal of the AND circuit 434 via the timer 430 and the NOT circuit 432 is changed from the low level to the high level, so that the switching element 303 is turned ON to apply the voltage V1 between the electrode 3 and the workpiece 2 (see FIG. 2J). The processing current which has flown by the auxiliary discharge circuit 200 is changed into the current flowing by the main discharge circuit 300, and reaches a current determined by the resistor 305 (see FIG. 2I). Thereafter, at time T8, the signal level of the timer 430 is changed from low to high after the setting time has passed (see FIG. 2F), the output signal of the AND circuit 434 via the NOT circuit 432 is changed to the low level. Then, the switching element 303 is turned ON only during the setting time of the timer 430, so that the processing current IM2 is attenuated thereafter, and then the processing current IM2 becomes zero at time T9 (see FIG. 2I).

It should be noted that when the resistor 304 is zero, the processing current of FIG. 2I is indicated by a solid line IM1, and when the resistor 305 is equal to a predetermined value, the processing current is indicated by a dot line IM2. It should also be noted that although the above-described case explains such a case that the processing current IM2 becomes zero at time T9, a very small current continuously flows in an actual case.

On the other hand, after the output level of the timer 430 is changed from low to high, at time T10, the setting time by the timer 440 has passed. Then, the output level of the timer 440 is changed from low to high, and the signal of the operation signal line M1 corresponding to the output of the AND circuit 444 via the NOT circuit 442 is changed from high to low (see FIG. 2H). It should be understood that the setting time of the timer 440 is set to such a time longer than the time during which the processing current is attenuated to become lower than, or equal to a predetermined value.

In such a case that the signal of this operation signal line M1 becomes the low level, the total control unit 700 judges that the electric discharge operation is once accomplished. At time T11, the total control unit 700 sets the signal of the discharge instruction signal line DS to the low level, and sets the R-terminal of the flip-flop circuit 407 to the high level, so that this flip-flop circuit 407 is reset, and the process operation is returned to the initial condition. In other words, one time period is complete.

Since this one time period may be accomplished within 1 to 2 μsec, the repetition frequency of the discharge processing operation can be selected to be higher than, or equal to 500 KHz, which is suitable for the highspeed discharge process. In other words, one time period is complete.

The above-described operation is directed to the normal discharge operation. Another description will now be made of operations about either extraordinary discharge operation called as an "immediate electric discharge operation" or a "semi-immediate electric discharge operation", or discharge operation approximated to extraordinary discharge operation with reference to FIG. 1 and FIGS. 3A to 3K. FIGS. 3A to 3K show timing charts and waveform diagrams. It should be noted that the same reference numerals shown in FIGS. 2A to 2K will be employed as those for denoting the same, or similar circuit elements.

Now, the signal of the discharge instruction signal line becomes a high-level signal and thus the discharge instruction is issued, as explained above, the switching element 203 is turned ON to thereby apply the voltage V2 between the electrode 2 and the workpiece 2, and a current I flows and the immediate electric discharge occurs (see FIGS. 2I and 2J). At this time, since the electric discharge is produced within the setting time of the timer 401, the signal of the auxiliary discharge preparation time line DT remains at the low level even at the time T4 during which the output of the timer 401 is changed from the low level to the high level (see FIG. 2K). This condition is recognized as the immediate discharge condition by the total control unit 700.

In such a case that this immediate electric discharge condition is continued, or the immediate electric discharge condition occurs at a frequency larger than a predetermined frequency, the total control unit 700 judges this case as the extraordinary condition, and may keep the signal of the discharge instruction signal line DS at the low level for a constant time. When the level of the signal of the auxiliary discharge preparation time line DT is not changed to the high level even when the setting time of the timer 401 has elapsed, the signal of the discharge instruction signal line DS is immediately set to the low level, so that the switching element 303 of the main discharge circuit 300 may not be turned ON.

The above description has been made of the immediate electric discharge condition, namely the signal level of the auxiliary discharge preparation time line DT is kept at the low level. Next, a description will now be made of such a case that the semi-immediate electric discharge occurs. That is, after the setting time of the timer 401 has elapsed and little time of the time T4 has passed (just before time T5), the electric discharge occurs and thus a current flows through the resistor 205, the output signal level of the current detector 41 is changed from the low level to the high level, and thus a pulse signal (see dot/dash line of FIG. 2K) is produced at the auxiliary discharge preparation time line DT corresponding to the output of the AND circuit 422. In the case that time "te" of this pulse signal is shorter than predetermined time, or in the case that an average value of this time "te" is shorter than preselected time in a predetermined operation number, the total control unit 700 judges this condition as the extraordinary condition and may keep the signal level of the discharge instruction signal DS at the low level for a constant time. This is because when the electric discharge is stopped during constant time, there is a great possibility that the electric discharge operation is returned to the normal condition.

As described above, if the signal of the auxiliary discharge preparation time line DT is utilized, then either the immediate electric discharge or the semi-immediate electric discharge which could not be conventionally detected can be detected, and therefore it is possible to obtain the electric charge machine capable of having the stable process operation.

Alternatively, instead of the timer 402, such a condition that after the setting time of the timer 401 has passed, the current of the auxiliary discharge circuit 200 becomes substantially constant may be detected by the current detector 410 functioning as the constant value detecting means.

Also, instead of the third timer constructed of the timer 430 and the timer 440, the operation means 470 may cause the current to flow through the main discharge circuit 300. Then, the current detector may detect that this current is attenuated.

EMBODIMENT 2

Figure 4:
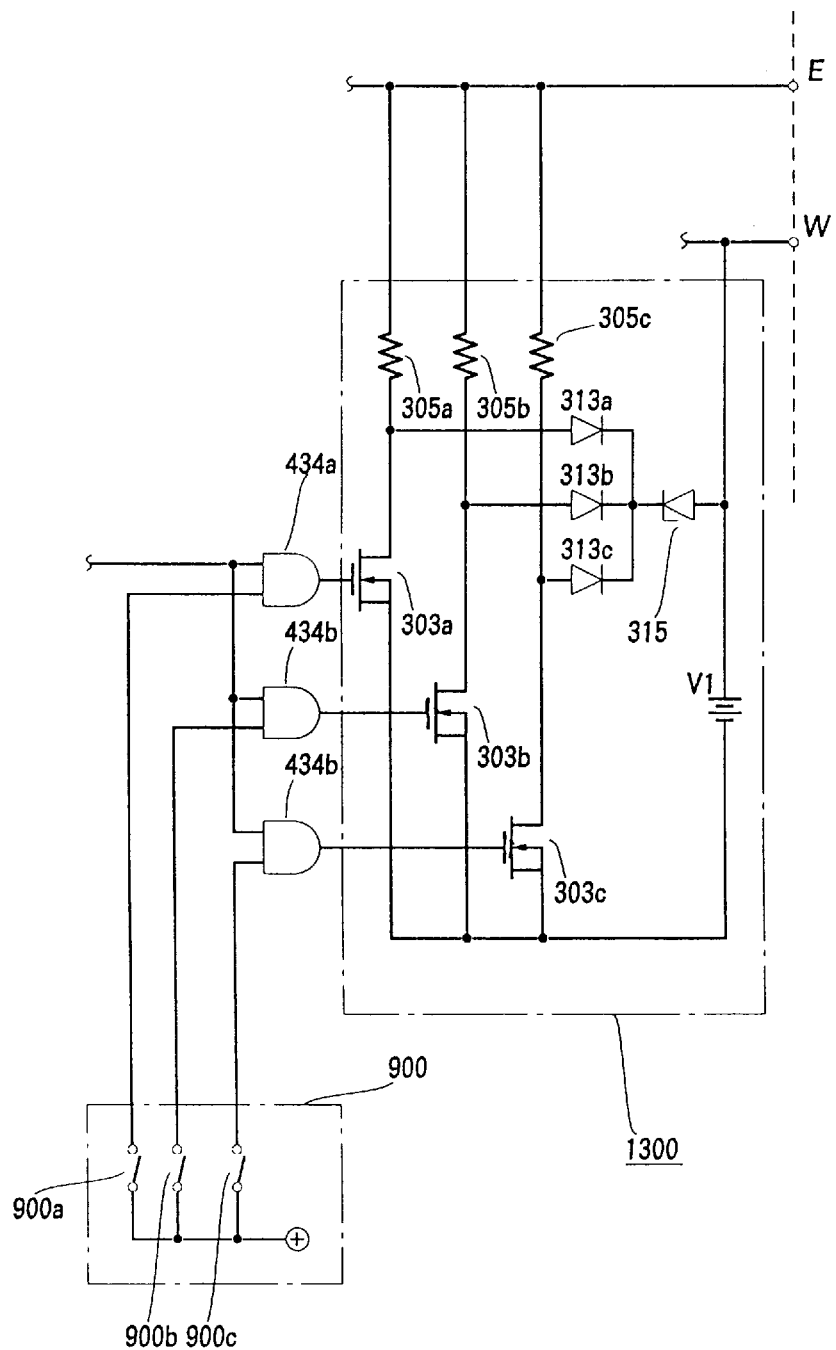
FIG. 4 is a circuit diagram of an electric discharge machine for showing an embodiment used to explain operations of another electric discharge machine of this invention.
Figure 5:
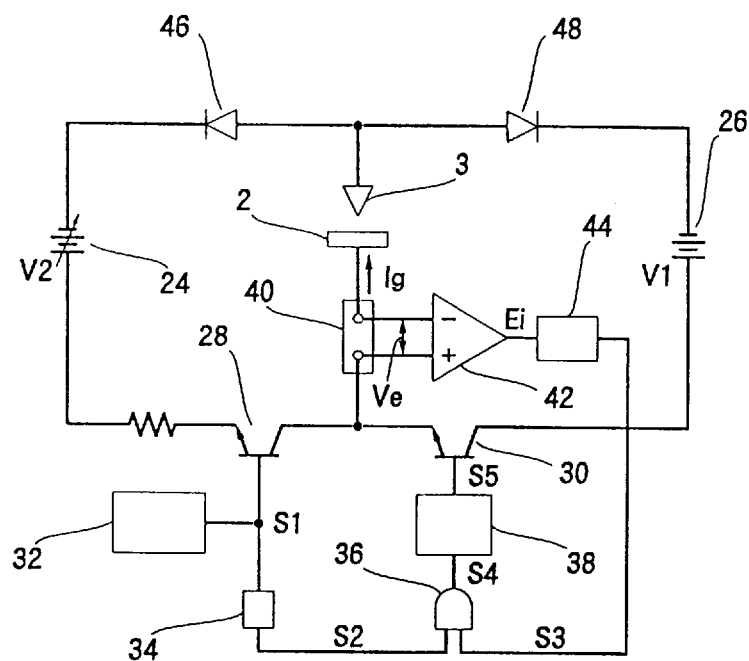
FIG. 5 is the circuit diagram of the conventional electric discharge machine.

Referring now to FIG. 4, another embodiment of the present invention will be explained. In FIG. 4, three sets of switching elements 303a, 303b, and 303c are provided. Resistors 305a, 305b, and 305c are series-connected to the respective switching elements. Between junction points among the respective switching elements 303a, 303b, 303c and the respective resistors 305a, 305b, 305c, and an anode of a DC power supply V1, the respective anodes of diodes 313a, 313b, 313c are connected to a cathode of a zener diode 315.

Each of outputs of AND circuits 303a, 303b, 303c is connected to a gate of each of these switching elements 303a, 303b, 303c. These AND circuits are arranged in such a manner that one inputs thereof are commonly connected to each other, and the other inputs thereof are connected via each of switches 900a, 900b, 900c of an output current switching device 900 to the anode of the power supply, so that switching of the switching elements 303a, 303b, 303c can be selectively controlled. It should be noted that a switching element selection means is constructed of the output current switching device 900 and the AND circuits 303a, 303b, 303c.

For example, assuming now that the first DC power supply V1 is selected to be 125 V, in general, since a discharge voltage is on the order of 25 V, the resistor 305a is 25Ω; the resistor 305b is 50Ω; and the resistor 305c is 100Ω. The inverse number of a ratio of the respective resistance values of these resistors becomes 4:2:1, which constitutes a binary number.

Referring now to FIG. 4, operation of the electric discharge machine with employment of the above-described arrangement will be described. An output current of a main discharge circuit 1300 (namely, a current produced when a terminal E and a terminal W are shortcircuited) may be varied such as 0, 1, 2, 3, 4, 5, 6, and 7 amperes, namely in 8 stages with a 1-ampere-stepwise manner by selectively turning ON/OFF the switches 900a, 900b, 900c of the output current switching device 900. This implies that the electric discharge currents can be controlled with a large number of current varying steps by employing a small number (only 3) of resistors. Accordingly, the entire circuit can be made single and inexpensive.

Also, if the switches 900a, 900b, 900c are constituted by outputs of a binary counter and this binary counter is counted up/down in response to a clock, then a step-shaped waveform may be outputted. As a consequence, an arbitrary slope-shaped current waveform may be outputted.

In accordance with the first invention, the following effects can be achieved. That is, since the current flowing through the auxiliary discharge circuit is detected after the first setting time of the first timer means, the erroneous detection of the electric discharge can be prevented by the current flowing through the electric capacity between the electrode and the workpiece. Since the auxiliary discharge circuit is operated until the second setting time of the second timer means, after the discharge pillar has been formed, this operation of the auxiliary discharge circuit is advanced to the main discharge circuit. After the third setting time of the third timer means, the repetition discharge period is ended. As a result, the discharge interruption time can be controlled and the stable discharge operation can be continued.

In addition to the effects of the first invention, the second invention owns the following effect. Since the constant value detecting means for detecting that the current value of the auxiliary discharge circuit becomes substantially constant after first time by the first timer means has passed, after the discharge pillar has been formed by the auxiliary discharge circuit, the operation can be advanced to the main discharge operation.

In addition to the effects of the first invention, the third invention owns the following effects. Since the main discharge current detecting means for detecting that after the main discharge circuit is operated by the operation means during the preselected time, the current of the main discharge circuit is attenuated, the attenuation of the operation current of the main discharge circuit can be more correctly detected, and thus the interrupt time can be grasped.

In accordance with the fourth invention, since the third setting time value can be automatically varied, there is such an effect that the stable discharge operation can be maintained by changing the interrupt time.

In accordance with the fifth invention, since the detection can be made by discriminating the semi-electric discharge from the normal electric discharge, even when the discharge processing condition is deteriorated by the semi-immediate discharge, there is such a effect that the electric discharge operation can be easily performed.

In addition to the effect of the fifth invention, according to the sixth invention, since the detection can be made by discriminating the immediate electric discharge from the normal electric discharge, there is such an effect that the electric discharge operation can be easily performed, even when the discharge processing condition is deteriorated by the immediate discharge.

In accordance with the seventh invention, in such a case that either the immediate discharge or the semi-immediate discharge happens to occur, since the discharge instruction signal is interrupted, there is such an effect that the further deterioration of the discharge processing condition can be prevented.

In accordance with the eighth invention, since the ratio is selected to the inverse number of the binary number, there is such an effect that the processing currents can be controlled with a large number of steps by employing a small number of resistors, and the electric discharge machine with the simple circuit can be realized.

While a specific embodiment has been described, it should be understood that the present invention is not limited to that embodiment, but may variously be modified, altered and changed within the scope of the present invention.

What is claimed is:

1. An electric discharge machine equipped with a main discharge circuit and an auxiliary discharge circuit for applying a voltage between an electrode and a workpiece, and for processing said workpiece by repeating a time period within which after said auxiliary discharge circuit has been operated, said main discharge circuit is operated and stopped, comprising:

auxiliary discharge current detecting means for causing the auxiliary discharge circuit to be operated in response to a starting signal and for detecting that a value of an auxiliary current flowing through said auxiliary discharge circuit exceeds a predetermined value;

first timer means having first setting time longer than time defined from said starting signal until flowing of a charge current into said auxiliary current is ended;

second timer means having second setting time defined after a detection is made that the value of said auxiliary current exceeds said predetermined value until said discharge operation is brought into a stable condition after said first setting time of the first timer means;

operation means for stopping said auxiliary discharge circuit after said second setting time has passed, and for causing said main discharge circuit to be operated during preselected time;

third timer means having third setting time longer than such time that after said operation means causes said main discharge circuit to be operated during said preselected time, the current value of said main discharge circuit becomes lower than, or equal to a predetermined value; and for producing an end signal after said third setting time has passed; and ending means for recognizing an end of said time period in response to the end signal of this third timer means.

2. An electric discharge machine as claimed in claim 1, wherein said electric discharge machine comprises: constant value detecting means for detecting that the current value of said auxiliary discharge circuit becomes substantially constant after said first time by said first timer means has passed, instead of the second timer means having second setting time defined after the value of said auxiliary current exceeds the predetermined value until said discharge becomes stable after said first time by the first timer means has passed.

3. An electric discharge machine as claimed in claim 1, wherein said electric discharge machine comprises: main discharge current detecting means for detecting that after said main discharge circuit is operated by said operation means during said preselected time, the current of said main discharge circuit is attenuated, instead of the third timer means having the third setting time longer than the time during which the current value of said main discharge circuit becomes lower than, or equal to the predetermined value after said main discharge circuit has been operated for said predetermined time by said operation means, and also for producing the end signal after this third setting time has passed.

4. An electric discharge machine as claimed in claim 1, wherein the value of the third setting time of said end means can be automatically varied.

5. An electric discharge machine as claimed in claim 1, further comprising:

auxiliary discharge preparation time detecting means for detecting time defined after said first setting time by said timer means has passed and until said auxiliary discharge current detecting means detects the auxiliary discharge current; and judging means for judging such a case that the time value of said auxiliary discharge preparation time detecting means is shorter than a preset time value as an extraordinary case.

6. An electric discharge machine as claimed in claim 5, wherein said predetermined time is zero.

7. An electric discharge machine as claimed in claim 5, wherein when said judging means judges it as the extraordinary case, said starting signal is interrupted.

8. An electric discharge machine as claimed in claim 1, wherein said electric discharge machine comprises:

a plurality of switching elements of said main discharge circuit;

a plurality of resistors series-connected to said switching elements, a ratio of respective resistance values of said plural resistors being equal to a reverse number of a binary number; and switching element selecting means for selecting operations of said switching elements.

* * * * *